Nov. 27, 1962  G. T. RANDOL  3,065,604
MASTER BRAKE CYLINDER WITH DUAL FLUID-DISPLACING MEMBERS
Filed July 1, 1960  2 Sheets-Sheet 1

Inventor

Nov. 27, 1962 — G. T. RANDOL — 3,065,604
MASTER BRAKE CYLINDER WITH DUAL FLUID-DISPLACING MEMBERS
Filed July 1, 1960 — 2 Sheets-Sheet 2
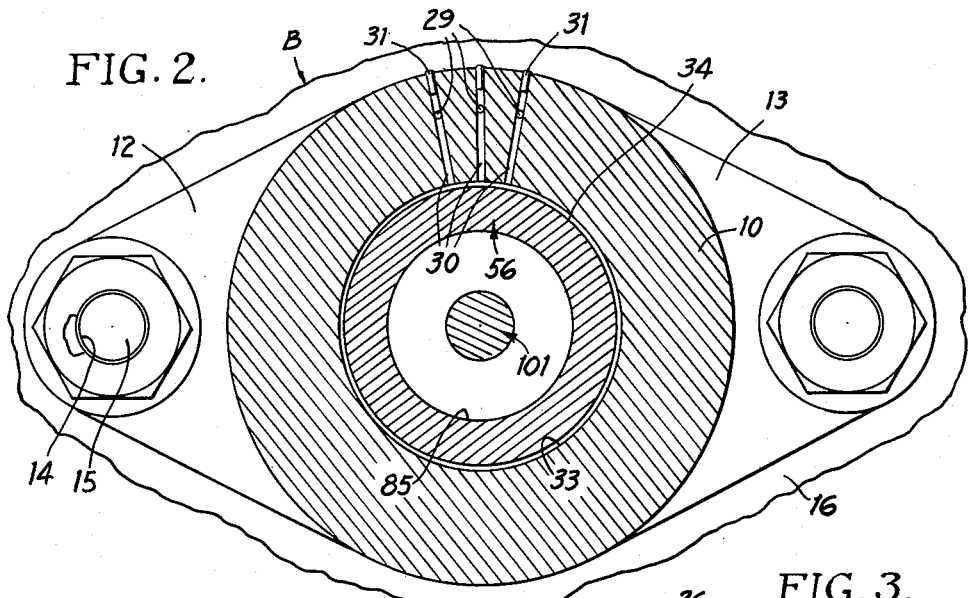
FIG. 2.
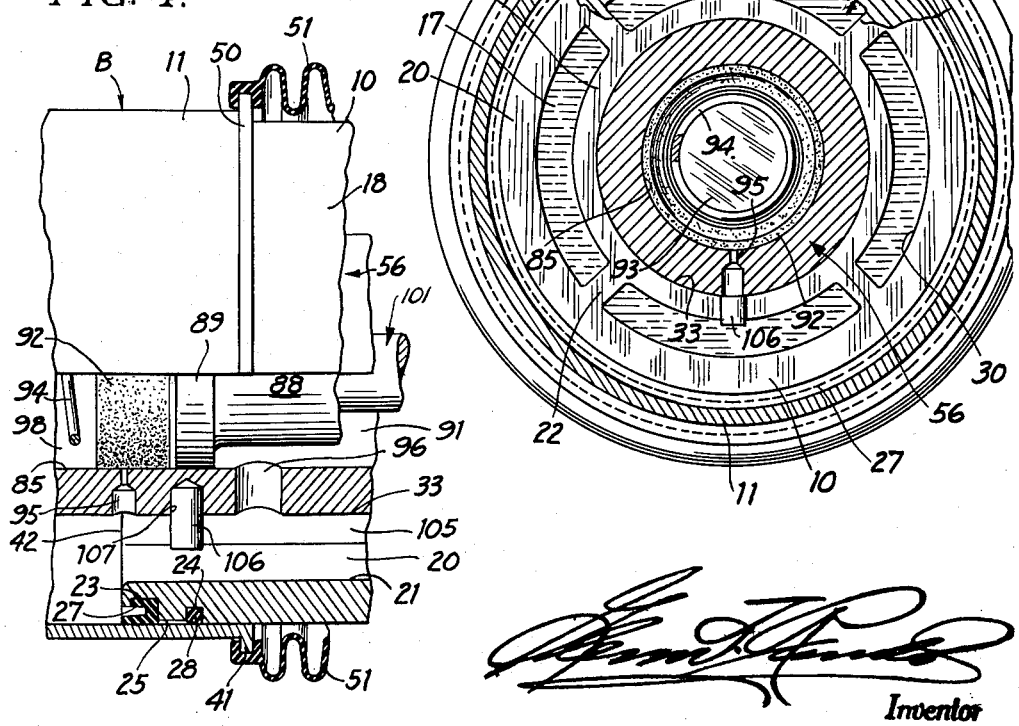
FIG. 3.
FIG. 4.
Inventor United States Patent Office 3,065,604
Patented Nov. 27, 1962

3,065,604
MASTER BRAKE CYLINDER WITH DUAL FLUID-
DISPLACING MEMBERS
Glenn T. Randol, 2nd Ave. and Paull St., Box 275,
Mountain Lake Park, Md.
Filed July 1, 1960, Ser. No. 40,237
12 Claims. (Cl. 60—54.6)

My invention relates to fluid pressure systems such as the hydraulic brake system on automotive vehicles and the like, the invention having particular reference to a novel and improved master cylinder characterized by dual reciprocable members adapted to amplify pressure on the fluid displaceable thereby through an outlet common to both members, to actuate the brakes.

In the art of master cylinders, the problems of producing higher pressures on the brake fluid without increasing the stroke of the fluid-displacing parts and the overall size of the conventional master cylinder used on motor vehicles, as well as the problem of effectively sealing the working surfaces subjected to such higher pressures, have received considerable attention. For example, various types of master cylinders have been proposed which utilize two-stage pressurizing of the brake fluid, wherein a low pressure piston of large diameter is employed to effect slack-take-up in the brake system, followed by actuation of a smaller piston to apply the higher pressures on the fluid column to intensify the brake application as required. Such master cylinders being known as the "compound type," and which have the serious disadvantages, of being too costly, of producing a momentary "lag" at the point of transition from low- to high-pressure operation with consequent erratic reaction on the brake-pedal, and of the ever present possibility of fractures at numerous sealing points subjected to high pressures, which, should such occur, would present an extremely hazardous situation since braking control of the car would be lost.

The present invention, therefore, seeks as a primary object to advance the art by providing a master cylinder of new and improved construction and operation wherein a pair of telescopically-related fluid-displacement members are adapted to have reciprocable movement toward and away from each other, and which define a variable volume working chamber therebetween, said chamber having a discharge outlet through one of said members which conveys to the usual brake lines and wheels cylinders, fluid at pressures substantially twice those producible a single-displacement member of the same diameter as one of the aforesaid pair, in response to actuating said pair of members simultaneously toward each other to reduce the size of said working chamber.

An object importantly related to the primary object next above, is to produce a master cylinder of the type referred to, wherein the pair of fluid-displacement members is selectively, severally and jointly operative to reduce the size of the working chamber and thereby pressurize the fluid therein in accordance with the working pressure desired.

Another object of the invention is the incorporation of the usual compensating and inlet ports in the outer fluid displacement member to cooperate with the discharge outlet therein, and wherein a variable volume fluid supply reservoir communicating with said compensating and inlet ports encircles the outer fluid-displacement member, the outer wall of said reservoir comprising a pair of cylindrical interfitting members forming the body of said master cylinder, one of said members being movable with the outer fluid-displacement member, and the other member being fixed to a support, and therefore serves to mount the master cylinder as a unit in operating position, for example, on the forward side of the vehicle firewall in the engine compartment.

A further important object of the invention, is to produce a master cylinder having dual-displacement members wherein said members are biased apart to normal relative disposition by a normally preloaded spring positioned in said chamber, said spring also serving in conventional manner to control the residual pressure valve associated with said discharge outlet.

A further object of the invention is to provide novel and improved sealing means for the working parts of the master cylinder wherein all surfaces exposed to high pressures generated in the working chamber between said fluid-displacement members utilize conventional seals, such as an expansible pliant cup-shaped seal on the head of the inner member, and a secondary annular lip-type seal at the bearing end of said member, thereby providing an economical method of sealing the working chamber against pressure losses, that is time-proven in conventional spool-type piston master cylinders. All other sealing points at atmospheric pressure on the fluid, as between the open ends of the contractible fluid reservoir housing members, and between the outer fluid-displacement member and stationary body member, are effectively sealed with lip-type annular pliant seals and the O-ring type of seal, with collector channels associated with said seals to return any leakby fluid via suitable passageways leading to the interior of the reservoir.

The present invention is particularly suited to produce super high pressures in the brake line of a motor vehicle, under influence of dual actuating means, such as the illustrated service and parking brake controls, or dual power members of a pressure differential operated servomotor, particularly that type of servomotor in which the power members are arranged with a common power chamber therebetween to move toward and away from each other as distinguished from prior art tandem-type arrangements wherein the power members move in the same direction for power-activation and inactivation. Accordingly the present novel master cylinder may be associated in various applications wherein dual actuating power forces are available for its operation with one of the fluid-displacement members connected to one of said forces, and the other fluid-displacement member connected to the other force.

An object related to the object immediately preceding is the novel provision of selectively activating said power forces to enable super pressure to be developed on the brake fluid under influence of both power forces, or to employ one or the other of said power forces to produce normal high pressures on the brake fluid corresponding to those produced by the conventional single-piston master cylinder.

A further object of the invention is to utilize one of the fluid-displacement members to apply and hold the vehicle brakes on, while the other member is inactivated, to provide a parking brake for the vehicle while standing, and wherein activation of both displacement members simultaneously under influence of both of the operator-controlled members in the driver's compartment of the vehicle, would produce super high pressures on the brake fluid for emergency stops.

A more specific object of the invention is to utilize all of the parts comprising the spool-type piston of a conventional foot-operated master cylinder, to produce the inner fluid-displacement member of the present improved master cylinder and wherein the other fluid-displacement member thereof is a tubular member open at one end and closed at the other in which said piston slidably operates, whereby both fluid-displacement members are relatively displaceable from normal brake "off" position to brake "on" position, or either of said members may have relative displacement with respect to the other in stationary inactivated position.

In a modified form of the invention there is disclosed a dual rack and pinion mechanism adapted to impart relative reciprocative movement to said dual displacement members in opposite directions under influence of actuating means comprising a single actuatable member, to pressurize the fluid in the same manner as when two actuatable members are utilized, one for each of the fluid-displacing members. It is therefore, another object of my invention to provide novel master cylinder construction operable by actuating means comprising either one of two actuatable members with the single member providing the specifical advantage of contributing to a smaller and more compact unit by using two relatively smaller diameter pistons whose combined cross sectional areas equal substantially the area of the conventional single-piston master cylinder. Therefore, the input forces in each instance are equal whether one or two input actuatable members are employed to produce a given pressure on the brake fluid.

With these and other objects and advantages in view, the invention consists of the novel combinations, constructions, and arrangements of the parts as hereinafter more fully described, set forth in the claims appended hereto, and disclosed in the accompanying drawings forming a part hereof, wherein:

FIGURE 2 is a transverse sectional view taken along the line 2—2 of FIGURE 1, showing the return passageways for return of seepage from the outer surface of the tubular fluid-displacement member;

FIGURE 3 is another transverse sectional view taken along the line 3—3 of FIGURE 1 showing the construction of the interior of the stationary section of the master cylinder body, and certain details of the two fluid-displacement members reciprocably mounted therein;

FIGURE 4 is a fragmentary view of FIGURE 1 showing a relatively adjusted disposition of the parts corresponding to brake "on" condition; and FIGURE 5 is a modified form of the invention in which the dual displacement members of the master cylinder are operated by a single actuating member such as the disclosed foot-operated pedal.

Figure 1:
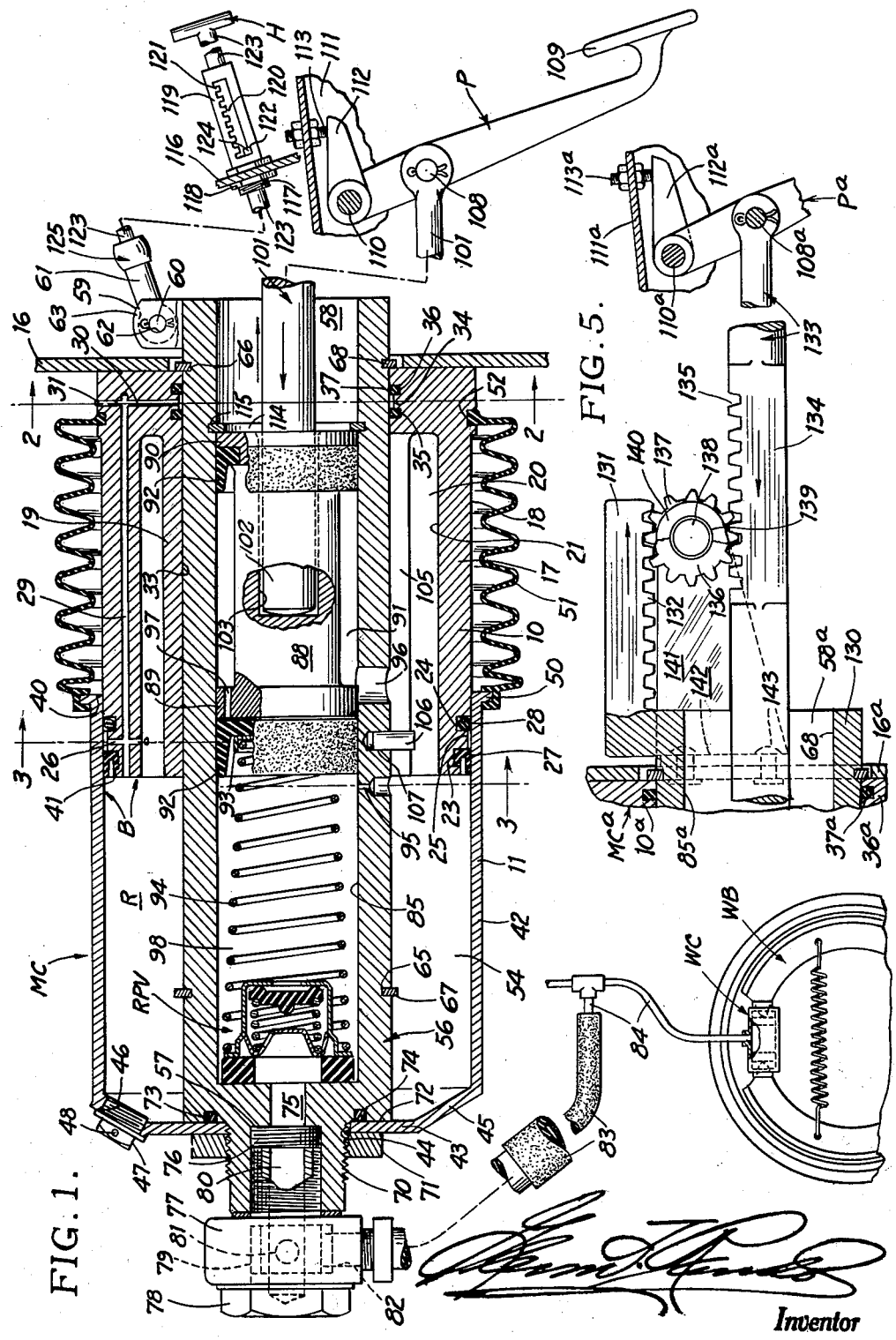
FIGURE 1 is a longitudinal vertical section through a master cylinder embodying my invention and showing the parts in their normal positions corresponding to brake "off" condition, and associated with exemplary controls therefor in the way of a manual and foot-operated member.

Referring now to the drawings, I have used the reference character MC to indicate the master cylinder as a whole, and the body thereof is designated as a whole by reference character B, and which comprises a stationary cup-shaped section or member 10, and a relatively movable cup-shaped section or member 11 telescopically-related to the member 10. The rear end of the stationary member terminates in a pair of diametrically opposed lateral flanges 12, 13 each provided with a hole 14, through which bolts 15 project to fasten the member to the forward side of the vehicle firewall 16 in the engine compartment, and thereby mounts the master cylinder in operating position as shown. The body member 10 has a cylindrical wall 17 provided with a cylindrical finished outer surface at 18, a coaxially disposed inner tubular sleeve at 19, said sleeve being circularly spaced at 20 from the inner cylindrical surface 21 of the wall 17 to provide a part of a fluid supply reservoir R therebetween. A plurality of interconnecting longitudinal ribs 22 coextensive with the interior of said body member 10 are utilized to interconnect the wall 17 and sleeve 19 to contribute rigidity to the body member 10 which is preferably a casting. The forward inner end portion of the finished surface 18 is provided with a pair of annular grooves at 23, 24, said grooves being interconnected by a shallow fluid collector channel 25, said channel communicating with a plurality of radially disposed passageways 26 through the wall 17 to thus interconnect the fluid supply reservoir with said channel. Groove 23 is fitted with an annular lip-type pliant seal 27, and groove 24 is fitted with an annular O-ring seal 28. A corresponding number of fluid passageways are shown at 29 intersect the aforesaid radial passageways 26, and also intersect another corresponding number of radial passageways 30 through the wall 17, the latter passageways being longitudinally spaced rearwardly from the first-mentioned radial passageways. The radial passageways 30 are closed at their outer ends by pressfitted plugs 31 or otherwise, and their inner open ends communicate with a longitudinal bore 33 through the sleeve 19. Another shallow fluid collector channel 34 is provided in the bore 33 in circular alignment with said radial passageways 30 and communicating therewith, said channel being disposed between two annular grooves 35, 36 and in continuous communication therewith. Each of these two grooves is fitted with a pliant O-ring seal 37 to thereby prevent leakby fluid from escaping to the exterior of said body member 10.

The open end 40 of the movable body member 11 telescopically receives the open end 41 of the stationary body member 10 as shown in FIGURE 1 whereby the seals 27, 28 render their interfitted relation fluid-tight at all relatively adjusted positions thereof. The movable member 11, is preferably fabricated as a metal stamping having a cylindrical wall 42 and a closed end wall at 43 provided with a central circular aperture at 44, the peripheral marginal portion of the end wall is offset rearwardly at 45 and formed in this offset portion is a threaded opening 46 which receives a complementally threaded plug 47 provided with a vent passageway 48 to interconnect the interior of the member 11 with atmosphere and thereby maintain the fluid supply reservoir at atmospheric pressure at all times, said plug 47 serving as a filler cap through the opening of which fluid is replenished to the fluid reservoir.

The open end of the cylindrical wall 42 terminates in an outstanding annular flange at 50 to receive the forward end of a flexible dust excluding boot 51, and the rear end of said boot engages an annular groove 52 spaced forwardly from the plugs 31 to stabilize the boot in operating position for relative reciprocable movement of the two body members 10, 11, to thereby maintain the finished surface 18 free of foreign matter that if present could act as an abrasive to accelerate wear between the interfitted body members.

The annular space 54 to the left of the open end 41 of the body member 10 as shown in FIGURE 1, is a continuation of the fluid space 20, therefore, the annular spaces 20 and 54 which define the interior of both of the body members 10, 11 form the fluid supply reservoir R, the reservoir being characterized by change in size as a function of the relative sliding adjustment of the body members 10, 11, and therefore is termed as the "variable volume" type. To accommodate this change in size, the quantity of fluid in the reservoir is never such as to completely fill the same as indicated by the fluid symbol in FIGURE 2. In this manner, when the body members are moving relatively toward each other and thereby reduce the size of the reservoir, the unfilled space therein receives the excess fluid, and when the body members are in their relative normal positions as shown in FIGURE 1, the expansion of the reservoir to normal size enables the fluid therein to assume its normal status with respect thereto, and thereby restores the unfilled space to normal size.

Slidably disposed in the longitudinal bore 3 and coextensive with both of the body members 10, 11, is a tubular fluid-displacement member disclosed herein as a cup-shaped piston 56, closed at its forward end by a wall 57 and open at its rear end 58, the latter end projecting through the bore 33 to the exterior of the body member 10, and is provided with a slotted lug 59 having a cross bore 60. Received in the slot of the lug is the eye end of an actuating rod 61 having a complemental hole 62 therethrough in registry with the cross bore 60. A pin 63 pivotally interconnects the rod eye to said member 56 for connection preferably to a manual control as will appear. The exterior of said displacement member 56 is provided with a pair of longitudinally spaced annular grooves at 65, 66, and fitted into each of these grooves is a split-type stop ring 67, 68 respectively, the rings being adapted to engage the opposite ends respectively of the sleeve 19 to limit the relative sliding movement of the displacement member 56 with respect to the fixed body member 10. In the normally adjusted position of the displacement member 56 as shown in FIGURE 1, the ring 68 is in engaging contact with the rear end of the sleeve 19. The forward end of the displacement member 56 is provided with a reduced diameter externally threaded extension 70 which projects through the aperture 44 in the closed end of said movable body member 11, and a lock nut 71 is threaded tightly on the extension to impinge the annular shoulder 72 formed by the juncture of the normal diameter of the displacement member 56 with said extension in fluid-tight sealed relation with respect to the aforesaid aperture, said sealing being augmented by an annular face groove 73 in the surface of said annular shoulder, provided with a pliant O-ring seal 74 subjected to compression by the threaded union of the displacement member 56 and movable body member 11 as a unitary assembly for movement together.

The closed end of said displacement member 56 is provided with a centrally disposed discharge outlet at 75 which merges with a threaded counterbore 76. The usual block fitting 77 is installed against the end of the extension 70 by a shouldered lock screw 78 having an annular external fluid channel 79 communicating with a blind bore 80 coaxial with and of the same diameter as the discharge outlet via a plurality of radial ports 81 through the wall of said channel 79, said latter channel being in continuous communication with a passageway 82 leading to the exterior of said block fitting, and connected to said passageway is a conventional flexible hydraulic conduit 83 which conveys the brake fluid under pressure through the brake lines 84 to the wheel cylinders, one being illustrated at WC to apply and release the associated vehicle brake WB as is understood.

The interior of the displacement member 56 is provided with a longitudinal bore 85 in which is slidably fitted another fluid displacement member herein disclosed as the parts of the conventional master cylinder comprising: a spool-type piston 88 having a pair of longitudinally spaced annular lands at 89, 90, the forward land serving as an end head land and the rearward land serving as a bearing land which define an annular fluid space 91 therebetween. The head land is provided with a seal 92 against which is arranged a spring seat 93 to receive reaction from a return spring 94 which is also effective to control a residual pressure valve shown generally in FIGURE 1 and indicated by the letter character RPV. All of the foregoing structure being of conventional construction and operation. Fluid being supplied from the reservoir to the interior of said displacement member 56 via the usual compensating and inlet ports 95, 96 respectively through the wall of said member to control the quantity of fluid in the hydraulic system which changes in volume as a function of the pressurizing and de-pressurizing of the fluid to operate the vehicle brakes. The usual ports at 97 are provided through the peripheral marginal portion of the head land to accommodate fluid flow between the annular space 91, and the variable volume pressure working chamber 98 disposed between the closed end of the displacement member 56 and the head land on the piston 88, said working chamber having communication with the discharge outlet 75 via said residual pressure valve RPV in a well known manner.

A push-rod 101 projects at its forward end 102 into a blind axial bore 103 in the piston 88 as shown in FIGURE 1. Engagement between the ends of said bore and push-rod is effective to move the piston 88 in the direction of the arrow, relatively to the displacement member 56 to thereby reduce the size of the working chamber 98 with resultant pressure applied to the fluid therein, and similarly the displacement member 56 is movable relatively to said piston 88 in the opposite direction (rearwardly) to additionally subject the fluid in the working chamber 98 to pressure defined by the surface on the end wall 57 which encircles the discharge outlet 75 in opposition to the corresponding confronting surface on the head land of the piston 88. Accordingly, it is seen that relative sliding movement of the two fluid displacement members toward each other 56, 88 is effective to substantially double the pressure on the fluid in the working chamber 98 as compared to the pressure than can be induced when either of said members is moved independently of the other in normal position as shown in FIGURE 1.

A longitudinal slot 105 is provided through the full length of the sleeve 19 which receives a pin 106 press-fitted in a hole 107 in the exterior of the displacement member 56 whereby the latter members inhibited from relative rotation with respect to the body member 10 so that the inlet ports 95, 96 are never blocked from the reservoir R, thereby maintaining continuous communication therebetween.

The push rod 101 is pivotally linked at 108 to an intermediate portion of a brake-pedal P provided with a foot pad 109 with the upper opposite end thereof pivotally suspended at 110 to a stationary bracket 111 rigid with a portion of the vehicle body such as the firewall aforesaid. A substantially horizontal arm 112 is integral with said pedal and extends rearwardly from the pivot shaft 110 into engagement normally with an adjustable stop screw 113 provided with a lock nut mounted on said bracket, whereby the normal released position of the pedal P is established under influence of a normally preloaded return spring and therefore the piston 88 under influence of the return spring 94, wherein the outer peripheral portion of the bearing land 90 engages a split stop ring 114 received by an internal annular groove 115 in the bore 85 of the displacement member 56, said stop ring defines the relative separation between said displacement members to fully take the vehicle brakes "off."

A fragmentary portion of an instrument panel in a vehicle is shown at 116, and rigidly mounted as by a threaded extension and lock nut shown respectively at 117, 118, on this panel portion is a tubular member 119 having a longitudinal slot at 120 through the wall thereof, the upper edge of which is formed with closely spaced flat bottom notches 121 and the extreme forward lower edge portion is provided with a flat bottom notch 122 in alignment with the first notch in the upper edge. Projecting through the tubular member is a push-pull rod 123 which carries a radial element in the way of a square pin 124 which is slidably and rotatably received through the slot 120 for selective engagement with said notches, the outer rear end terminating in a handle H, and the forward inner end having a universal ball connection at 125 with the rod 61 whereby manual reciprocation of the displacement member 56 is effected in response to first rotating the handle H clockwise from the driver's viewpoint to disengage the pin 124 from the notch 122 into the path of said slot 120 between said upper notches and the said lower notch to release said rod 123 for manual retraction to the right as viewed in FIGURE 1 to whatever position necessary to obtain the desired pressure application on the brake fluid, and then further rotating of the handle in a clockwise direction positions the pin 124 in the upper notch corresponding to such retracted position of the handle H thereby holding the brakes "on" to thus serve as a parking brake for the vehicle.

Thus, the driver may apply the brakes by selective operation of either the handle H or the pedal P, or by operating both of these operator controls simultaneously, to produce super presures on the brake fluid for emergency stops, as, for example, when the present master cylinder MC is utilized in heavy-duty vehicles such as trucks or busses as distinguished from lighter vehicles such as pleasure cars requiring less braking effort therefore only one of said controls required to produce such effort.

*Operation*

In the operation of my novel and improved dual-piston master cylinder MC, the parts are normally in the positions of FIGURE 1 under expansive action of the return spring 94, however, the invention contemplates that the action of this spring may be augmented by springs associated with the operator handle and pedal, to at least support their weights under influence of gravity. As will be noted from an inspection of FIGURE 1, this spring is disposed within the working chamber 98 to react between the residual pressure valve RPV and the head land 89 of the hydraulic piston 88 thereby separating the displacement members 56, 88 to their normal relatively adjusted positions shown in FIGURE 1 wherein the vehicle brakes are "off," and the compensating port 95 is open for fluid adjustment between the working chamber and reservoir R, while residual pressure valve RPV is operative under influence of the spring 94 to establish a minimum pressure on the column of brake fluid between the master cylinder and wheel cylinders. It is therefore, seen that the operation of the piston 88 within the displacement member 56 is conventional and well known in all respects.

If the vehicle brakes are desired applied, the operator would press on the pedal P and pull backward on the handle H simultaneously where super pressure is desired as in the case of an emergency stop. This joint action on the aforesaid controls by the operator, advances the hydraulic piston 88 into the displacement member 56, and at the same time retracts the latter member relatively to the piston, to thereby reduce the side of the working chamber 98 wtih consequent pressurizing of the fluid therein to effect the braking action desired. During this relative sliding movement of the displacement member 56 and piston 88 toward each other in the directions indicated by the arrows applied to these parts, the supply reservoir R is reduced proportionally in size since the movable body member 11 moves with the member 56, and the fluid in the reservoir occupies the normally unfilled space therein until the hydraulic pistons 56, 88 are separated to their normal relative positions shown in FIGURE 1 wherein the brakes are "off." Thus, the supply reservoir R must never be completely filled as demonstrated in FIGURE 2 wherein the normal level of the fluid is inidicated. The interior of the reservoir is maintained at atmospheric pressure via the vent passageway 48 in the filler plug 47, and it should be noted that the lower margin of the opening 46 serves as an indicator for the normal level of the fluid when replenishing such, so that sufficient space will be provided within the reservoir into which the fluid can displace as a function of the reduction in size of the reservoir between the body members 10, 11. Accordingly, the reservoir accommodates variations in size without interfering with the relative adjustment between the fluid-displacing components 56, 88 during opweration of the master cylinder MC to apply and release the brakes.

The cross sectional areas of the interior of the end wall 57 which encircles the discharge outlet 75, and of the hydraulic piston 88, determine the pressure that can be exerted on the fluid in the working chamber 98 when both displacement members 56, 88 are slidably moved toward each other from their normal positions shown in FIGURE 1, by operation of the operator controls H and P. However, it should be noted that the pressure working surface on the displacement member 56 is less than the pressure working surface on the hydraulic piston 88 due to the outlet 75 through the end wall of the member 56. Therefore, under such circumstances, the piston 88 would apply less pressure to the fluid than the displacement member 56 but move a larger volume of fluid through the outlet 75, when both are actuated simultaneously by equal forces produced by the operator on the handle H and the pedal P. In the case where the piston 88 is actuated alone independently of the displacement member 56, the pressures which can be developed by operator force on the pedal P are a factor of the cross sectional area of the piston, while the pressures which can be developed by the displacement member 56 acting independently of the piston in response to operator force applied to the handle H would be more than a corresponding operator force on the pedal P, due to the lesser working surface carried by the member 56 which augments the hydraulic leverage.

The invention contemplates that the discharge port 75 may be incorporated in the displacement member 56 through the circular wall of the working chamber 98, and thereby eliminate such opening as shown for the purpose in the end wall. In this manner, the pressure working surfaces on the complemental displacement members 56, 88 would be identical, and therefore capable of applying the same pressures to the fluid in the working chamber 98, and when simultaneously applied to double the pressure on the fluid over that producible by either of said members operated independently of the other under influence of their associated operator controls P or H.

Release of the brakes is effected in conventional fashion by removing operator pressure from one or both of the controls P and H depending on whether both or only one of the displacement members 56, 88 are under operator actuation. Upon removal of such pressures the return spring 94 expands to bias the displacement members 56 and 88 apart to their respective normal positions shown in FIGURE 1 wherein the compensating port 95 is open to the working chamber 98 to allow any adjustments in the volume of fluid therein, and the residual pressure valve has operated to adjust the fluid column in the brake lines to release the brakes and at the same time retain a minimum pressure on such fluid to insure against possible cavitation in the hydraulic system. Also the stop rings 68, 114 carried by the displacement member 56 are disposed in contact with the rear ends respectively of the body member 10 and displacement member 56 to establish the normal separated positions of said displacement members as shown in FIGURE 1, in readiness for another brake-applying cycle as above explained.

It is obvious from the foregoing description that the operation of the fluid-displacing parts within the displacement member 56 is conventional in all respects to that of the conventional master cylinder operated from a pedal, and with which present-day motor vehicles are equipped at the factory.

The master cylinder MC is provided with effective seals between the moving parts to prevent loss of fluid from the reservoir, yet accommodate relative movement of the body member 10, 11 accompanied by reduction in size of the supply reservoir R as explained above, and where any fluid may be displaced from the working chamber 98 past the head seal on the piston 88 such is trapped in the annular space 91 and returned to the reservoir via the inlet port 96, and the fluid in the reservoir is retained by the seals and interposed collector channels and passageways as shown to insure that any fluid that may work toward the exterior of the body members 10, 11 and displacing member 56 and stationary body member 10, as a result of relative operation of the working parts is collected in the channels 25, 34 and returned to the reservoir via the passageways 26, 30, and 29.

The invention contemplates that the fluid-displacement members 56, 88 may be actuated by power means in lieu of the operator controls herein shown by way of illustration only, such power means may take the form of a pressure differential operated servomotor having dual power members connected respectively to the two displacement members 56, 88, particularly that type of servomotor wherein a common power chamber is employed between said power members to impart opposite power movements to said members to reciprocate the displacement members 56 and 88 toward and away from each other.

It is further obvious from the disclosure that the reservoir R may be wholly contained within the stationary body member 10 and connected to the ports 95, 96 by a convolution of flexible conduit to accommodate relative sliding movement of the displacement member 56, and wherein the annular reservoir space within the movable body member 11 would serve as a housing for such conduit.

As previously pointed out, the operator has the choice of simultaneously displacing the pair of fluid-displacement members 56, 88 from their respective normal positions depicted in FIGURE 1 to relative positions shown in FIGURE 4 for maximum braking pressure, or may displace either of said members from its normal position relatively to the other member while the latter member occupies its normal position to produce lower braking pressures. The outer displacement member 56 being operable relatively to the piston 88 in normal position, to serve to hold the brakes "on" while the vehicle is parked. This parking brake operation being effected by pulling the handle H to set the brakes and then rotating it to locking position wherein the radial element 124 engages the notch 121 in alignment therewith to thus hold the outer displacing member 56 in its fluid pressurizing position. Also in this connection it should be noted that when the hydraulic piston 88 alone is utilized as the fluid displacing member, the outer displacement member 56 is prevented from moving forwardly by the stop ring 68 bearing against the outer end of the sleeve 19, while, if the displacement member 56 alone is utilized as the means for pressurizing the fluid, as when parking the vehicle, the hydraulic piston 88 is stabilized in its normal position as shown in FIGURE 1 by the stop 113 engaged by the pedal arm 112. Thus, it is seen that neither of the displacement members can move in the same direction of movement of the operator-actuated member to pressurize the fluid where only one of said members is activated to reduce the size of the working chamber 98 therebetween.

*Modified Actuating Means*

FIGURE 5 discloses a modified form of the invention wherein all elements previously described, are identified by the same reference characters distinguished, however, by suffixing the letter "a" to each.

A modified cup-shaped fluid-displacement member 130, similar to member 56 (see FIGURES 1–4), is provided at its open end with a rearwardly extending rack 131 parallelly spaced from the axis of said member, said rack having gear teeth 132 and is adapted to replace the slotted embossment 59. The push-rod 101 as modified is identified by reference numeral 133 and includes a rack portion 134 having gear teeth 135 disposed in confronting relationship with respect to the gear teeth 132. Rotatably disposed between said rack teeth 132, 135 is a gear 136 provided with teeth 137 in constant meshing relation with said rack teeth, to interconnect the displacement member 130 and push-rod 133 for opposite rectilinear movements from normal disposition, as indicated by the arrows applied to these two parts. The gear is rotatably mounted on a fixed shaft 138 which has its opposite ends supported in aligned holes 139 in the free ends of a pair of spaced apart members 140, 141 respectively, said latter members being laterally flanged at 142 for rigid assembly with said firewall 16a as by rivets 143. Accordingly, the support members produce a bracket for supporting the shaft 138 on which the gear 136 rotates to impart reciprocable movements to said gear racks 131, 134, and therefore, to operate the hydraulic displacement members 130 and 88 toward and away from each other to operate the hydraulic brakes on the motor vehicle.

This modification eliminates the manual control shown at H in FIGURE 1, but retains the brake pedal P$^a$ mounted on the pivot shaft 110a which in turn is supported on the bracket 111a, the latter including the adjusting screw 113a and associated lock nuts as shown. Arm 112a movable with the pedal, engages said adjusting screw to establish the normally released position of said pedal and parts operated thereby.

In operation, this modified structure, is normally disposed as shown in the figure wherein the hydraulic pistons 88 and 130 are fully separated to normalize the pressure on the fluid in the working chamber 98 as defined by the residual pressure check-valve RPV, and thus establish the master cylinder MC$^a$ in brake "off" released position. A brake-applying operation may be effected by depressing the pedal P$^a$ which transmits rectilinear movement to the push-rod rack 134, rotatable gear 136 and thence to the rack 131 of member 130, to impart an identical rectilinear movement opposite to that of the push-rod 133, thus moving the hydraulic pistons 88, 130 toward each other with resultant reduction in the size of the working chamber 98 which pressurizes the fluid therein and discharges the same through the fluid outlet 75 in a manner similar to that previously described in connection with the first embodiment (FIGURES 1–4). Initial movement of the hydraulic pistons 88, 130 toward each other, closes the compensating port 95 which operation conditions the working chamber 98 to pressurize the fluid therein. Upon removal of operator force from the pedal P$^a$, the master cylinder piston 88 and member 130 return to their normal relative positions as shown in the figure under influence of the return spring 94, and wherein the stop ring 68a abuts the rear finished face on the master cylinder body section 10a, the piston 88 engages the stop ring 114 mounted in the bore 85a, and the pedal arm 112a contacts the lower rounded end of the adjustable stop screw 113a, to establish the master cylinder MC$^a$ in the position shown.

It is thus seen that this modificaion provides for operaion of the master cylinder MC$^a$ by a single actuating element such as the disclosed foot-operated pedal P$^a$ with the advantage over the first embodiment of eliminating coordinated effort on the two operator controls H and P illustrated in FIGURE 1, and of utilizing the master cylinder MC$^a$ on motor vehicles as a replacement unit for the single-piston conventional master cylinder, operated from a similar pedal. Movement of the pedal P$^a$ imparts a slight vertical swinging movement to the push-rod 133 due to the arcuate path described by the pivotal connection 108a. This slight swinging movement of the push-rod, is not sufficient to appreciably affect the normal meshing relationship of the gear racks with the pinion 36, and particularly the rack 134 integral with said push-rod, such swinging movement actually serving to accommodate the oscillatory path of movement of the push-rod when moved by the pedal P$^a$ without interrupting the gear connection between the rack 134 and gear 36.

A further advantage provided by the FIGURE 5 modification is that the master cylinder MC$^a$ may be utilized in operative association with pressure differential booster motors having a single work-performing element commonly employed to assist in the operation of the conventional master cylinder as is well understood. The actuating force exerted on a single work element or operator member such as the pedal P<sup>a</sup>, is the same as when the handle H and pedal P are operated jointly, to displace the hydraulic pistons 56, 88 toward each other to pressurize the brake fluid to a given factor. Thus, whether the dual hydraulic pistons are actuated solely from the pedal P<sup>a</sup> or jointly from the handle H and pedal P, an equivalent actuating force is required for a given fluid displacement in each case. However, this modification, which employs the pedal P<sup>a</sup> as the sole means for actuating both pistons simultaneously, enables the use of two pistons of relatively smaller diameter whose combined cross sectional areas when equal to the area of the conventional single-piston master cylinder, displace the same volume of fluid as the single-piston unit would, therefore, contributing to a more compact master cylinder unit for the purpose.

From the foregoing description augmented by an inspection of the drawings, it will be appreciated that I have produced a new and improved master cylinder that utilizes all of the time-proven structure and sealing means; that is compact and economical of construction; that occupies substantially the same installation space as the conventional master cylinder; and that is capable of producing twice the pressure on the brake fluid as compared to pressure production by the conventional master cylinder with a piston of the same area as one of the dual piston-like members 56, 88.

Reference is now made to the terminology used in the foregoing description and in the appended claims in which the identifying expressions and/or terms employed are intended to convey meanings which include the range of reasonable equivalents in the patent sense. For example, the expressions "body," "body members," "working chamber," "displacement members," are intended to include any means for pressurizing the fluid as a function of relative movement of two elements toward each other whether or not the associated fluid supply reservoir is modulated from normal size. The terms "left," "right," "top," "bottom," "front," "rear," and other directional words or characters are intended to have only relative connotation for convenience in describing the structure in the position depicted in the drawings, and are not intended to be interpreted as requiring any particular orientation with respect to associated structure external to the present disclosure or to the operating position thereof.

Although I have illustrated a preferred embodiment, and a modification, and described certain obvious modifications without illustrating the same, it will be appreciated that I do not wish such to be limiting as to the exact construction and/or arrangement of parts shown and/or described, since it is evident that modifications, variations, changes and substitutions may be made therein without departing from the proper scope and fair meaning of the subjoined claims.

Having thus described my invention, I claim:

1. In a master cylinder having dual fluid-displacing elements for use in a hydraulic pressure system, a stationary casing having an axial bore, and a fluid supply reservoir in said casing, comprising: an outer and an inner telescopically-related cylindrical element in said bore and relatively displaceable from normal positions with respect to said casing and to each other; a variable volume pressure working chamber disposed between said elements to pressurize the fluid therein in response to relative displacement of said elements to reduce the size of said working chamber; a pair of spaced ports interconnecting the reservoir and interior of said outer element; a discharge outlet in said outer member for said working chamber; a normally preloaded spring operably disposed in said working chamber and adapted to react between said elements to separate them to their respective normal positions; stop means incorporated between said casing and outer element for defining the relative displacement thereof; another stop means incorporated between said elements for defining the normal position of the inner element with respect to the outer element; and means for operating said elements to effect reduction in the size of said working chamber.

2. In a master cylinder having dual fluid-displacing members for use in a hydraulic pressure system, a stationary casing having an axial bore, comprising: a tubular fluid displacement member closed at one end and open at the other and slidably disposed in said bore; a piston-type fluid displacement member slidably disposed in said first-named displacement member; a variable volume pressure working chamber disposed between the closed end of said first-named displacement member and the inner confronting end of said piston displacement member; a casing movable with said first-named displacement member and adapted to have telescopic fluid-sealed relationship with respect to said stationary casing; a variable volume fluid supply reservoir defined by the interiors of said stationary and movable casings; a discharge outlet through the closed end of said first-named displacement member for said working chamber; a normally preloaded spring operably disposed in said working chamber to bias said displacement members apart to their respectively normal positions to normalize the size of said working chamber; a pair of spaced fluid inlet ports interconnecting said reservoir with the interior of said first-named displacement member, one of said ports communicating with said working chamber when the two displacement members are in their respective normal positions; stop means incorporated between said stationary casing and the first-named displacement member to define the relative displacement of the same; another stop means incorporated between said displacement members to define their relative normal positions; and means for operating said displacement members to effect reduction in the size of said working chamber.

3. A master cylinder constructed in accordance with claim 2 including a residual pressure valve operably associated with said discharge outlet, and a one-way pressure discharge valve incorporated in said residual pressure valve to convey fluid under pressure from said working chamber to the discharge outlet; a normally preloaded spring operably incorporated between said valves to oppose opening of said one-way valve; and means on said residual pressure valve receiving reaction from said first-mentioned spring to control establishment of a minimum pressure on the column of break fluid external to said one-way valve.

4. A master cylinder constructed in accordance with claim 3 including a pair of spaced annular sealing members interposed at the initial telescopic portions on each of said casings; and an annular collector channel between said sealing members, and which communicates with said reservoir via a passageway, to return any leak-by fluid to the reservoir and accommodate relative movement of the movable casing with respect to the stationary casing to vary the size of said reservoir as a function of the relative displacement of the first-named displacement member with respect to said stationary casing.

5. A master cylinder constructed in accordance with claim 4 including a pair of spaced annular sealing members disposed between the said axial bore and outer cylindrical surface of the first-named displacement member; a collector channel disposed between said last-mentioned channels; and passageway means interconnecting said collector channels to return any leak-by fluid to said reservoir.

6. In a master cylinder constructed in accordance with claim 2 in which the piston-type displacement member comprises: an annular head land longitudinally spaced from an annular bearing land; an annular channel interconnecting said lands to provide an annular fluid space therebetween in continuous communication with the other of said inlet ports; a plurality of longitudinal ports through the peripheral portion of said head land in radially spaced relation with respect to the axis of said piston-type member, and which are adapted to interconnect said annular chamber with said working chamber; a pliant cup-like seal on the end of the head land; an annular lip-type pliant seal associated with the bearing land with the lip portion thereof exposed to said annular chamber; a blind axial bore opening to the rear exterior of said piston-type member; and a thrust element projecting into said blind bore in engagement with the end thereof to interconnect the same with said operating means to operate said piston-type element against the reaction from said spring.

7. In a combined master cylinder and reservoir having dual fluid-displacing elements: a body member having two cup-shaped shells with one of said shells relatively movable with respect to the other; an outer and inner telescopically-related cylindrical element relatively displaceable toward and away from each other; a variable volume pressure working chamber disposed between said elements for pressurizing the fluid therein; a variable annular fluid space between said shells and outer element to define said reservoir; a pair of spaced inlet ports interconnecting said reservoir and the interior of said outer element; a normally preloaded spring for biasing said elements apart to their respective normal positions; a pair of spaced stop elements on the exterior of said outer element and movable therewith into engaging relation with said other shell to define the relative displacement of the outer element with respect to said other shell; a stop element on the interior of said outer member and which is engageable by the other element to establish the normal relative position of the same with respect to the outer element; a discharge outlet in the outer element for said working chamber; and means for operating said elements simultaneously toward and away from each other to vary the size of said working chamber, and for operating said elements separately relatively to the other element while the latter element occupies its normal position to reduce the size of said working chamber.

8. A master cylinder constructed in accordance with claim 2 wherein said operating means for the two displacement members comprise: two separate personally operated members, one being adapted to act directly on the tubular member, and the other being connected directly to the piston displacement member to operate the same.

9. A master cylinder constructed in accordance with claim 2 wherein said operating means for the two displacement members comprise: dual rack and interconnecting pinion mechanism operatively connected respectively to said displacement members to impart opposite rectilinear movements thereto; a fixed shaft on which the pinion rotates in constant meshing relationship with said racks; and an actuator including an output element adapted to act on one of said racks to operate said mechanism.

10. A master cylinder constructed in accordance with claim 2 wherein said operating means for the two displacement members comprise: an actuator having dual output elements connected respectively to said displacement members to impart opposite rectilinear movements to the latter.

11. A master cylinder constructed in accordance with claim 2 wherein said operating means for the two displacement members comprise: an actuator having a single output element for operating at least one of said displacement members in a rectilinear path of movement.

12. A master cylinder constructed in accordance with claim 2 wherein operating means for the two displacement members include: a mechanical interconnection adapted to reciprocate said displacement members in opposite directions under influence of a force acting in one direction on one of said displacement members.

References Cited in the file of this patent
UNITED STATES PATENTS
2,556,288      Milster _____ June 12, 1951

UNITED STATES PATENT OFFICE
CERTIFICATE OF CORRECTION

Patent No. 3,065,604                      November 27, 1962

Glenn T. Randol

It is hereby certified that error appears in the above numbered patent requiring correction and that the said Letters Patent should read as corrected below.

Column 1, line 48, before "a" insert -- by --; column 3, line 15, for "specifical" read -- special --; column 4, line 48, for "that" read -- which --; line 71, for "3" read -- 33 --; column 5, line 32, for "together" read -- as a unit --; column 6, line 19, for "toward each other 56, 88" read -- 56, 88 toward each other --; line 28, after "members" insert -- are --; same column 6, line 68, for "clockwise" read -- counter-clockwise --; column 7, line 44, for "side" read -- size --; line 69, for "opweration" read -- operation --; column 10, line 68, for "36" read -- 136 --; column 12, line 22, for "respectively" read -- respective --; line 46, for "break" read -- brake --.

(SEAL)         Signed and sealed this 20th day of April 1965.

Attest:

ERNEST W. SWIDER                            EDWARD J. BRENNER
Attesting Officer                              Commissioner of Patents